United States Patent [19]

Born

[11] Patent Number: 5,423,103
[45] Date of Patent: Jun. 13, 1995

[54] LASER DISC BUFFING APPARATUS

[75] Inventor: Joseph Born, Lincolnwood, Ill.

[73] Assignee: Machine Research Corporation of Chicago, Chicago, Ill.

[21] Appl. No.: 172,588

[22] Filed: Dec. 23, 1993

[51] Int. Cl.$^6$ .......................... G11B 3/58; G11B 23/50
[52] U.S. Cl. ........................................ 15/97.1; 369/72
[58] Field of Search .............. 15/102, 97.1, 88.2, 15/88.3, 77, 74; 360/128, 137, 129; 369/72

[56] References Cited

U.S. PATENT DOCUMENTS

| | | | |
|---|---|---|---|
| 1,335,352 | 3/1920 | Slowey | 369/72 |
| 1,343,156 | 6/1920 | Prinz | 369/72 |
| 4,202,071 | 5/1980 | Scharpf | 15/88.3 |
| 4,476,601 | 10/1984 | Oka | 15/88.3 |
| 4,520,470 | 5/1985 | d'Alayer de Costemore d'Arc . | |
| 4,556,433 | 12/1985 | Clausen . | |
| 4,561,142 | 12/1985 | Mischenko et al. . | |
| 4,654,917 | 4/1987 | Yeung . | |
| 4,662,025 | 5/1987 | Fritsch . | |
| 4,709,437 | 12/1987 | Hehn et al. . | |
| 4,713,856 | 12/1987 | Clausen . | |
| 4,750,231 | 6/1988 | Kogashiwa . | |
| 4,783,870 | 11/1988 | Yeung . | |
| 4,825,497 | 5/1989 | Nagao et al. . | |
| 5,090,078 | 2/1992 | Kamakura et al. . | |
| 5,146,382 | 9/1992 | Yao-ko | 360/137 |
| 5,228,022 | 7/1993 | Compton et al. | 15/97.1 |

FOREIGN PATENT DOCUMENTS

| | | | |
|---|---|---|---|
| 372785 | 12/1992 | Japan | 369/72 |
| 12832 | 1/1993 | Japan | 369/72 |
| 159528 | 6/1993 | Japan | 369/72 |
| 303871 | 11/1993 | Japan | 369/72 |

OTHER PUBLICATIONS

The Discwasher CD-2$^{tm}$ CD Polish and Scratch Remover System.

*Primary Examiner*—David A. Scherbel
*Assistant Examiner*—Tony G. Soohoo
*Attorney, Agent, or Firm*—Lloyd L. Zickert; Adam H. Masia

[57] ABSTRACT

This invention relates to a laser disc buffing apparatus in which a buffing wheel is rotated on an axis perpendicular to the axis of the rotating laser disc and under compression against the disc to remove scratches or marks on the entire surface of the disc while cleaning the disc.

26 Claims, 7 Drawing Sheets

LASER DISC BUFFING APPARATUS

DESCRIPTION

This invention relates in general to a laser disc buffing apparatus, and more particularly to a laser disc buffing apparatus in which a buffing wheel is rotated under compression against a rotating laser disc to remove scratches or marks from the surface of the readable area of the laser disc by smoothing the surface of the disc.

BACKGROUND OF THE INVENTION

Heretofore, it has been well known to clean the surface of an optical or laser-readable disc to eliminate distortion caused by foreign materials such as dust, smudges, oil, grease, dirt, hairs, fingerprints, or other similar substances which adhere to the protective coating or readable surface area of the laser disc. Such substances, distort the optical reading characteristics of the disc. It has also been known to provide systems or devices for buffing discs to remove scratches.

Laser discs were initially cleaned by hand with a cloth or brush and some type of cleaning solution. However, hand cleaning often resulted in uneven cleaning of the disc as well as distortion-producing scratch damage to the disc. Various mechanical disc-cleaning devices have been proposed to alleviate the problems which arise in hand cleaning laser discs. For example, various cleaning devices are disclosed in the following U.S. Pat. Nos. 4,520,470; 4,556,433; 4,561,142; 4,654,917; 4,662,025; 4,709,437; 4,713,856; 4,750,231; 4,783,870; 4,825,497; 4,854,001; 5,090,078; and 5,228,022.

While all of these patents emphasize the need for cleaning the disc surface, some of these patents state that scratches or marks on the disc surface are inconsequential. For instance, U.S. Pat. No. 4,654,917 explains that scratches on the surface of the disc do not affect the optical reading of information from the laser disc because the laser beam of a common reading device focuses below the surface of the disc. Other patents listed above stress the need to avoid circumferential scratches on the disc surface. For example, U.S. Pat. No. 4,561,142 explains that tangentially or concentrically oriented scratches may affect the reading of the disc, and U.S. Pat. No. 4,662,025 stresses the need to clean the laser disc in a radial direction such that any scratching of the laser disc will only be in the radial direction. Accordingly, at least some of the prior art recognizes the reading problem resulting from scratches or marks on a laser disc.

It has also been known to apply a scratch-removal substance to one or more scratches on the readable area of a disc, and thereafter hand-buff the area of the substance in a circular motion to ostensibly remove the scratch. This procedure requires prior identification of the scratch or scratches, and may result in not removing hard-to-see scratches. Further, the buffing action is not uniform with respect to the entire readable area.

The prior art generally uses parallel or nearly parallel cleaning elements to contact the disc for removing contaminants. While these devices may be satisfactory for the purpose of removing such contaminants from the surface of the disc, they are inadequate for applying the forces necessary for buffing the surface of the disc to remove scratches or marks from the entire laser-readable surface of the disc.

Consequently, although some of the prior art speaks in terms of cleaning the disc, scrubbing the disc, or hand buffing the disc in a radial fashion, the prior art does not show a compact device using a buffing wheel to engage and buff the disc at an angle substantially perpendicular to the disc and under substantial compression forces which removes marks or scratches from the disc by uniformly smoothing the entire surface of the disc.

SUMMARY OF THE INVENTION

The present invention overcomes the above problems in providing a laser disc buffing apparatus which removes scratches or marks from the surface of an optically readable laser disc by smoothing the entire readable surface area of the disc. The laser disc buffing apparatus of the present invention is compact in size and generally includes a disc: support arm, a polishing or buffing wheel, and a main body which supports the buffing wheel perpendicularly to the disc.

The disc support arm includes a hub and spindle for rotatably supporting the central area of the disc, a driving wheel for supporting and rotatably engaging the outer edge or periphery of the disc, and a conical idler roller for rotatably supporting the disc between the central area and the outer edge. The hub, driving wheel, and idler roller control the rotation of the disc about a first axis. The disc support arm also includes an upstanding arm on which the main body is guidable and slidable between an open disc receiving or removing position and a closed disc buffing position.

The main body includes a cavity adapted to receive and rotatably maintain the buffing wheel about a second axis which is substantially perpendicular to the first axis. The main body also includes a gear drive train between the buffing wheel and the driving wheel when the main body is in the closed position such that rotation of the buffing wheel causes rotation of the disc. A latching mechanism is provided for releasably maintaining the body in the closed position.

In operation, a laser disc is placed in the laser disc buffing apparatus centrally on the hub and spindle and with its outer edge or periphery on the driving wheel. The main body is then moved to the closed position which causes the buffing wheel to fold or partially collapse on and engage the disc under compression and the latching mechanism to lock the apparatus in the closed position. A handle retractable into the face of the buffing wheel is extended from the buffing wheel to function like a crank for manually rotating the buffing wheel. The drive train between the wheel and the disc driving wheel simultaneously causes the rotation of the driving wheel and of the disc. Thus, the rotating buffing wheel buffs the rotating disc under significant compression and at an offset position from the radius to smooth out the entire surface of the disc which removes the scratches. Any suitable abrasive cleaning or buffing compound may be used in conjunction with the buffing wheel, if desired, or the buffing wheel may be impregnated with a suitable abrasive, or the wheel may be structured only for cleaning a disc. After buffing is completed, the latch mechanism is released, the main body is moved to the open position, and the buffed disc is removed.

As above noted, the apparatus of the invention, while useful to buff out scratches on a disc, may be used merely for cleaning a disc if desired. If used only for cleaning, a cleaning wheel may be exchanged for the buffing wheel.

It is contemplated that the disc-buffing apparatus may be scaled for different size laser discs including the compact laser disc, the mini laser disc, and the record size video laser disc. The disc buffing apparatus for use on the compact laser disc is preferably scaled for storage purposes to fit within a double compact disc case when it is in the closed position.

Further, a modification includes a plurality of buffing wheels instead of a single wheel to allow the height of the apparatus to be reduced while still buffing the entire readable surface.

It is therefore an object of the present invention to provide a laser disc buffing apparatus which removes scratches or marks from the surface of a laser disc to restore original playback and tracking quality.

Another object of the present invention is to provide a laser disc buffing apparatus which removes scratches or marks from the surface of a laser disc by smoothing out the entire readable surface of the disc.

Another object of the present invention is to provide a laser disc buffing apparatus which removes scratches or marks from the surface of a laser disc by rotating a buffing wheel against a rotating disc under compression whereby the buffing wheel rotates on an axis perpendicular to the axis of rotation of the disc.

Other objects, features and advantages of the invention will be apparent from the following detailed disclosure, taken in conjunction with the accompanying sheets of drawings, wherein like reference numerals refer to like parts.

DESCRIPTION OF THE INVENTION

Figure 1:
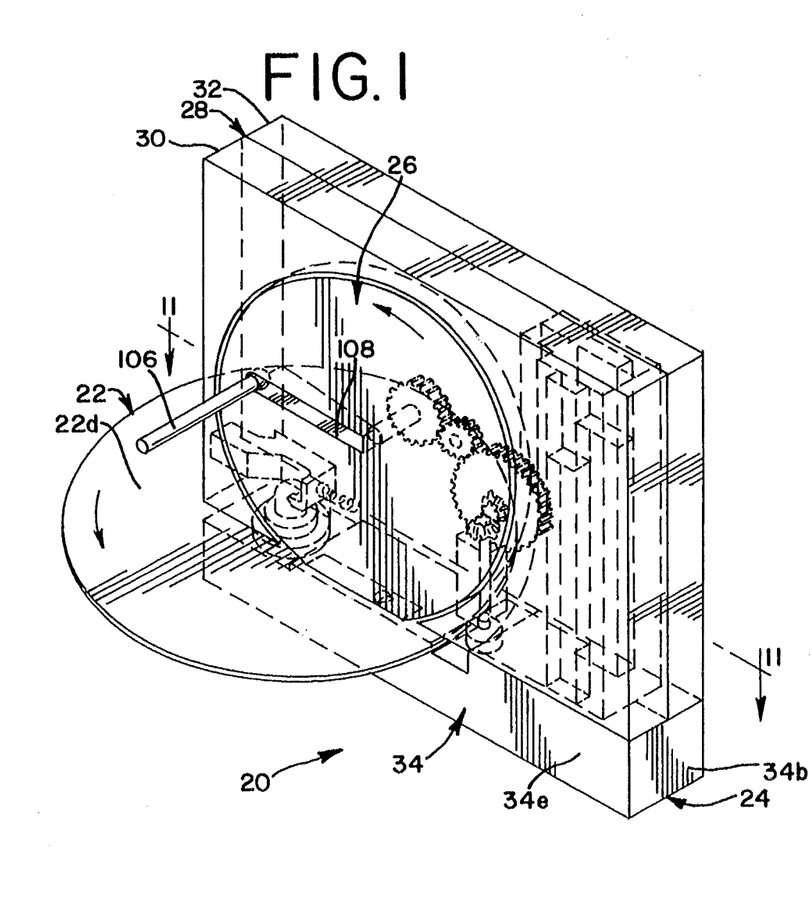
FIG. 1 is a perspective view of the laser disc buffing apparatus of the present invention in closed position with a laser disc positioned in the buffing apparatus.
Figure 2:
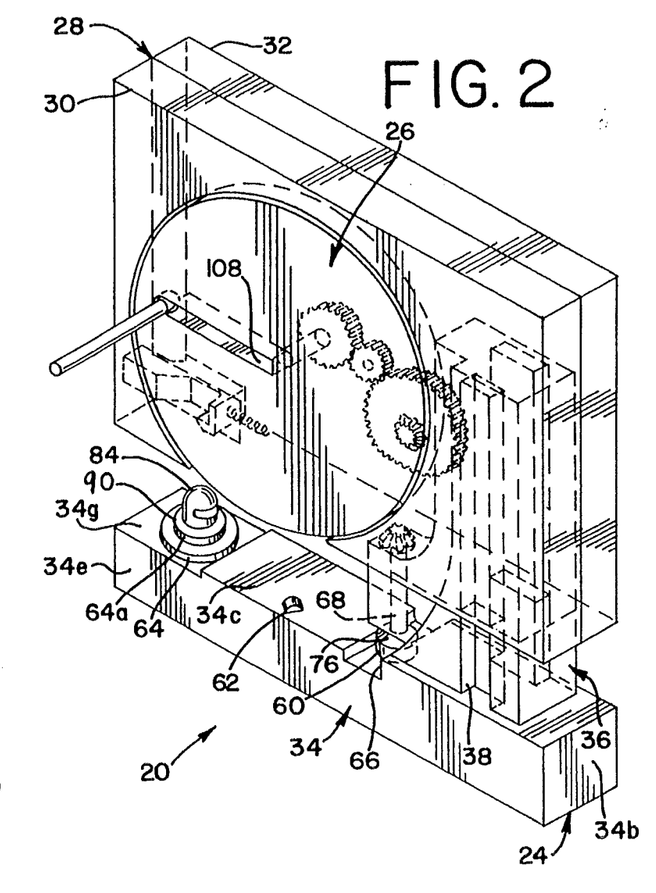
FIG. 2 is a perspective view of the laser disc buffing apparatus in open position.
Figure 3:
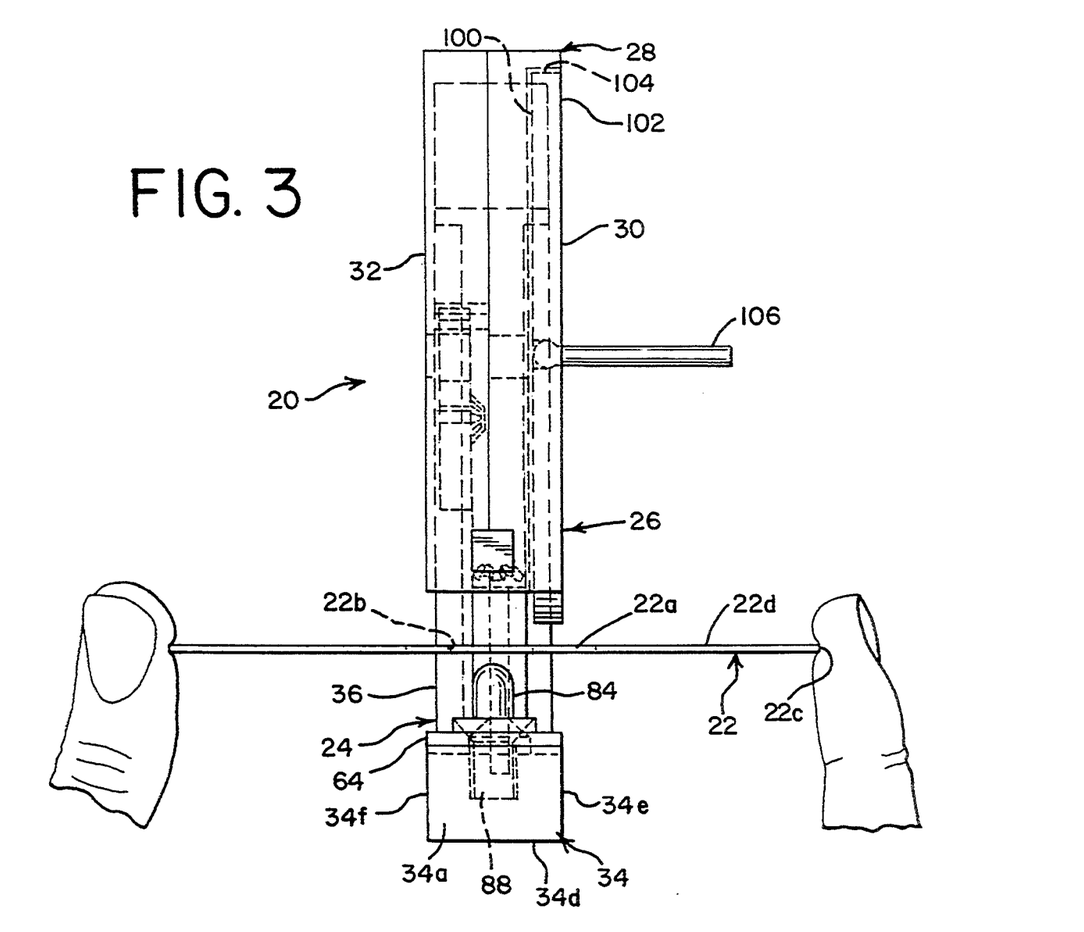
FIG. 3 is a front elevational view of the laser disc buffing apparatus in open position and a laser disc prior to placement on the spindle and hub of the buffing apparatus.
Figure 5:
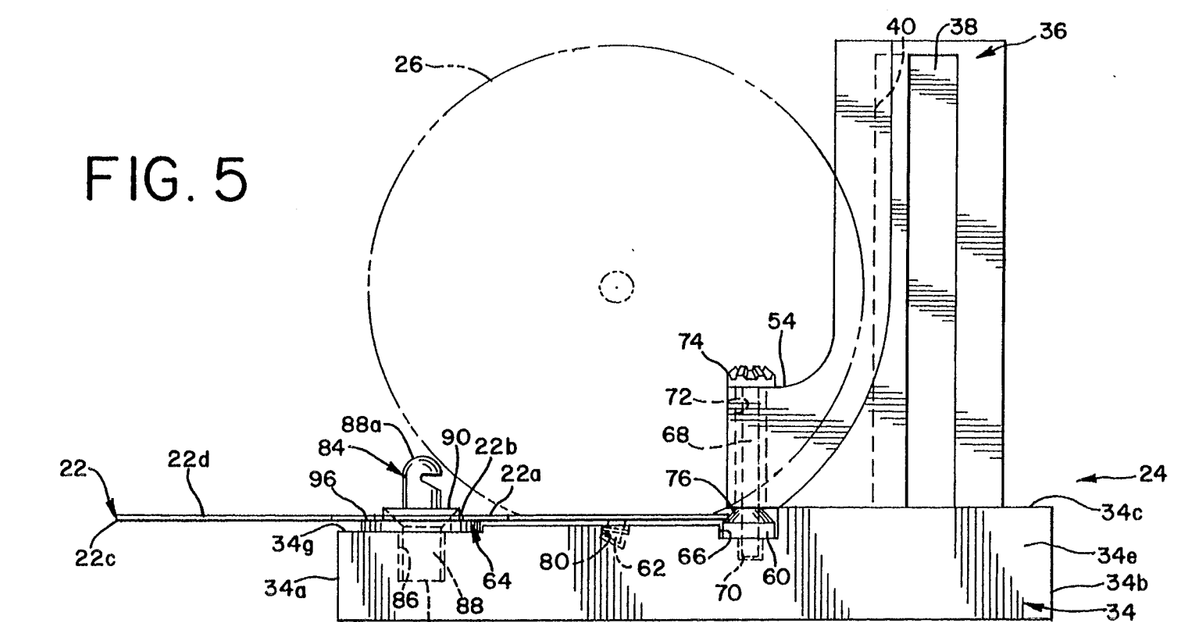
FIG. 5 is a side elevational view of the disc support arm, a laser disc positioned on the disc support arm, and the buffing wheel in phantom.
Figure 6:
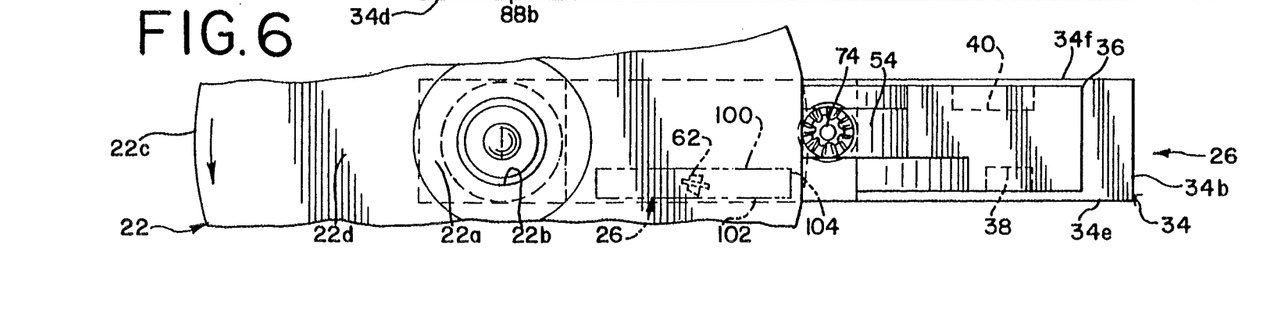
FIG. 6 is a top plan view of the disc support arm, showing the laser disc in fragmentary, and the buffing wheel in phantom.
Figure 7:
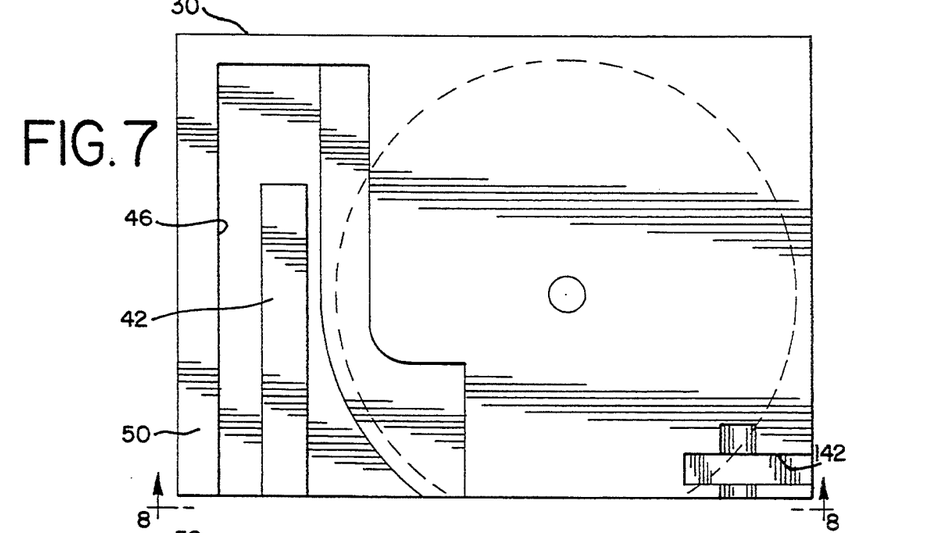
FIG. 7 is a side view of the inside surface of one side wall member of the main body.
Figure 8:
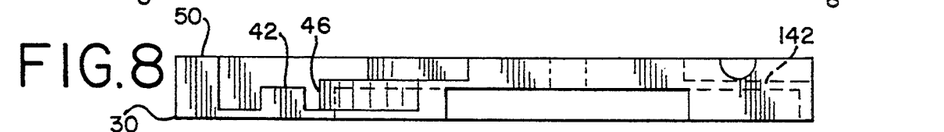
FIG. 8 is a bottom plan view of the side wall member in FIG. 7 taken substantially along line 8—8 of FIG. 7.

Referring now to the drawings, and particularly to FIGS. 1 to 3, the laser disc buffing apparatus of the present invention, generally indicated by numeral 20, is shown in open and closed positions. FIG. 1 illustrates a laser disc 22 positioned in the buffing apparatus 20 in the closed disc engaging position. FIGS. 2 and 3 illustrate the buffing apparatus 20 in the open position and adapted to receive the laser disc 22. The circular laser disc 22 includes a central area 22a, a center aperture 22b, an outer edge 22c, and an optical or laser readable surface 22d between the central area 22a and the outer edge 22c, as seen in FIGS. 3, 5 and 6. The laser disc 22 may be inserted by hand into the buffing apparatus 20, as shown in FIG. 3, or may alternatively be inserted by any suitable mechanical system (not shown).

Figures 11, 12, 13, 14, 15, 16, 17:
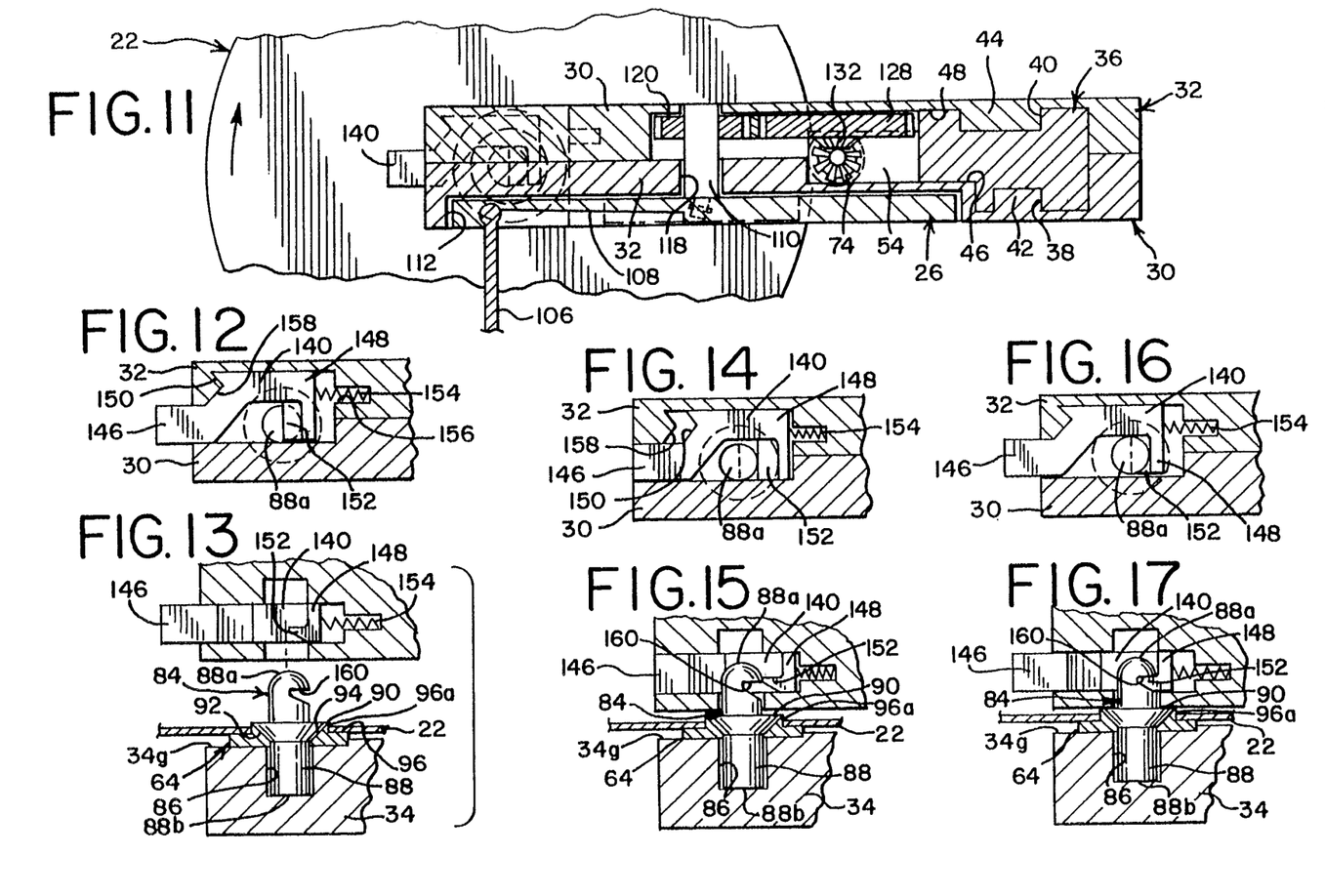
FIG. 11 is a horizontal cross section of the laser disc buffing apparatus taken substantially through line 11—11 of FIG. 1.
FIG. 12 is a fragmentary horizontal sectional view of the latch mechanism, showing the top plan view of the latch and latch pin prior to the engagement of the latch with the latch pin.
FIG. 13 is a fragmentary vertical sectional view of the latch and latch pin prior to the engagement of the latch with the latch pin.
FIG. 14 is a view similar to FIG. 12, but illustrating the engagement of the latch with the latch pin.
FIG. 15 is a view similar to FIG. 13, but illustrating the engagement of the latch with the latch pin.
FIG. 16 is a view similar to FIGS. 12 and 14, but illustrating the latch locked on the latch pin.
FIG. 17 is a view similar to FIGS. 13 and 15, but illustrating the latch locked and latch pin in locked position.

The laser disc buffing apparatus 20 of the present invention generally includes a disc support arm 24, a polishing or buffing wheel 26, and a main body 28 having two side wall members 30 and 32 which are assembled together and slidably received on the disc support arm 24. The side wall 30 maintains the buffing wheel 26 on an axis substantially parallel to the main body 28 and perpendicular to disc 22. The disc support arm 24 and the main body 28 coact to compress and partially collapse the buffing wheel 26 against the disc 22 under sufficient pressure at an offset radial position, as seen in FIGS. 1, 6 and 11, such that rotation of the buffing wheel 26 on the rotating disc 22 buffs out scratches or marks from the surface 22d of the disc 22 by smoothing out the surface 22d.

As further illustrated in FIGS. 1 to 11, the disc support arm 24 includes a rectangular box-shaped base 34 and an upstanding arm 36 suitably attached to the base. The base 34 has front, back, top, bottom, and side walls 34a, 34b, 34c, 34d, 34e, and 34f, respectively. The upstanding arm 36 is located toward the back wall 34b of base 34 and attached perpendicularly to the top wall 34c of base 34. The upstanding arm 36 has vertically extending slideways or grooves 38 and 40 on the side surfaces which are adapted to guidably and slidably receive ribs 42 and 44 of the side wall members 30 and 32 of the main body 28. More specifically, the ribs 42 and 44 are vertically positioned in arm receiving cavities 46 and 48 respectively located on the inner faces 50 and 52 of the side walls 30 and 32, as best shown in FIGS. 4, 7, 8, 9 and 10. The arm receiving cavities 46 and 48 slidably receive the upstanding arm 36. This enables the entire main body 28 to reciprocally slide on the disc support arm 24 between the open and closed positions, as seen in phantom in FIGS. 1 and 2. The top of the ribs 42 and 44 act as stops engaging the top of the grooves 38 and 40 of the arm 36, thereby limiting the upward movement of the main body. The upstanding arm 36 also includes a bearing member 54 which extends from the front of the upstanding arm 36. The bearing member 54 is also received in the arm-receiving cavities 46 and 48.

The disc support arm 24 further includes a disc driving wheel 60 for driving the disc, an idler roller 62 for supporting the intermediate area of the disc, and a hub 64 and spindle 64a for rotatably supporting the disc 22, as generally illustrated in FIGS. 1 and 2.

Figure 4:
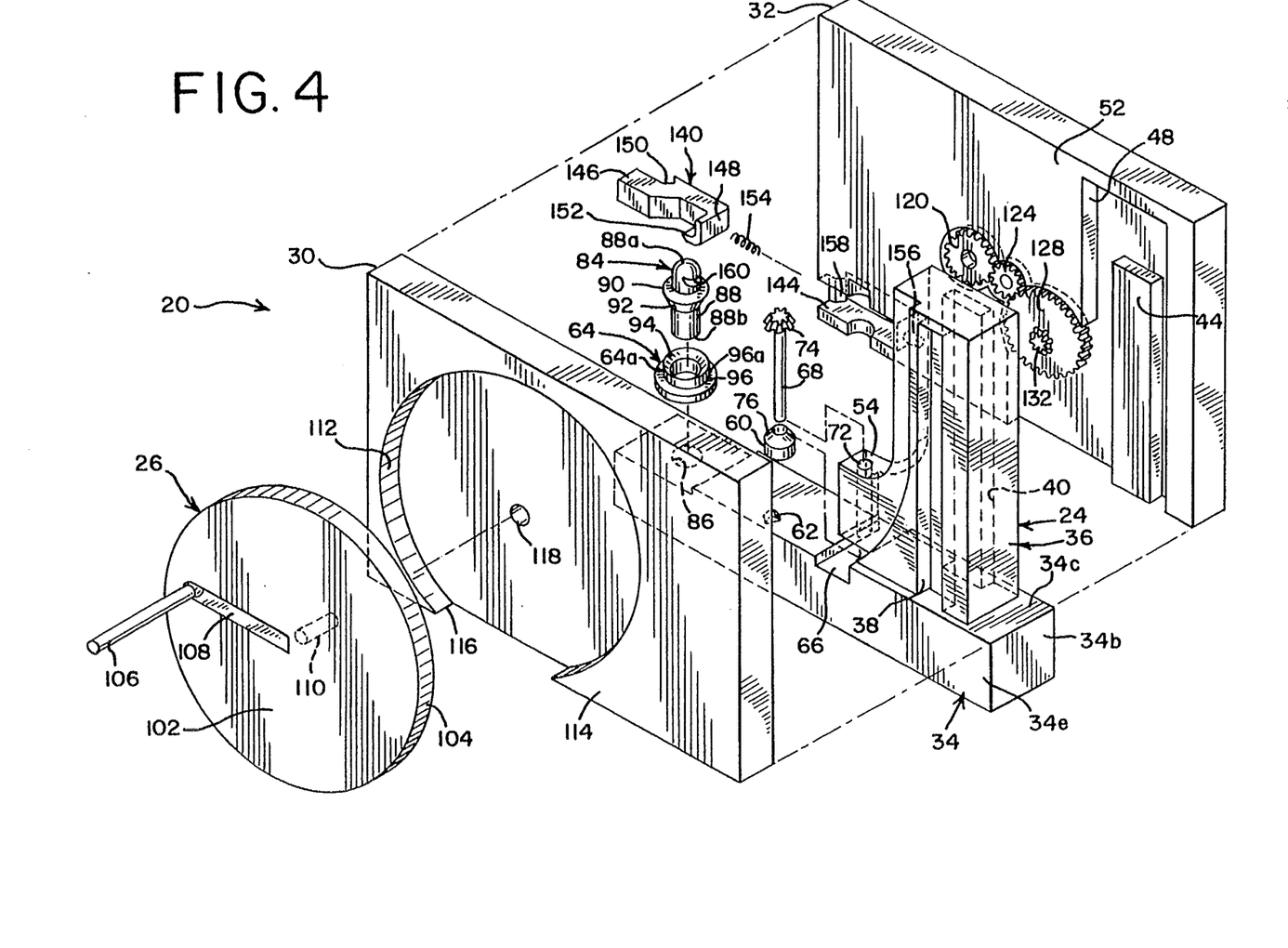
FIG. 4 is an exploded perspective view of the laser disc buffing apparatus illustrating the disc supporting arm, the buffing wheel, and the side walls of the main body.

More specifically, FIGS. 4 and 5 illustrate the driving wheel 60 positioned in a driving wheel slot 66 located in the top wall 34a of the base 34 and extending between the side walls 34e and 34f and under the bearing member 54 of the upstanding arm 36. The driving wheel slot 66 is adapted to rotatably receive the cylindrical driving wheel 60. The driving wheel 60 is preferably of a resilient rubber or plastic and suitably secured to a centrally positioned vertically extending cylindrical shaft 68 which extends through the driving wheel slot 66 into a centrally located bearing 70 in the bottom of slot 66. The bearing 70 is adapted to rotatably receive the lower end of the shaft 68 and thereby maintain the position of the driving wheel 60 as it is rotated. The shaft 68 also extends upwardly from the driving wheel 60 through an aperture 72 in the bearing member 54 of the upstanding arm 36 and is suitably connected to a miter or bevel gear 74 which is drivingly rotated, as described below. The upper end of the driving wheel 60 includes a beveled surface 76 adapted to engage the outer edge 22c of the laser disc 22 to rotate as well as support the disc, as seen in FIG. 5.

The idler roller 62 is preferably a hard plastic roller and suitably rotatably mounted in an idler roller cavity 80 on a surface just below the top wall 34c of the base 34 to project above the surface for contacting the disc. The idler roller cavity 80 is located on the base 34 offset closer to side 34e than side 34f to correspond with the position of the offset buffing wheel 26 and in opposing relation to the wheel, as best shown in FIG. 6. The idler roller cavity 80 is adapted to suitably rotatably mount the conical or cone-shaped roller 62 which rotatably supports the disc 22 between its central area 22a and its outer edge 22c to prevent the disc from bending under a buffing force placed on the readable surface 22d of the disc. The idler roller 62 is of a conical shape and rotatably mounted to compensate for engagement along a radius of the disc. Thus, the idler roller prevents depression of the surface of the disc directly under the area that will be subject to the greatest amount of pressure from the buffing wheel. The idler roller rotates along an axis canted to the planes of the disc and the buffing wheel, as seen in FIGS. 4 and 5, and in the same vertical plane as a radius of the disc. Consequently, the idler roller avoids undue deflection of the disc in the area of buffing wheel pressure, avoids any resulting displacement of the support forces and buffing forces of the buffing wheel, and further avoids tilting of the disc caused by the offset buffing wheel because the idler roller is placed directly under the buffing wheel.

The hub 64 and spindle 64a are rotatably mounted in position on the base 34 by a latch pin 84 which is suitably secured in a cylindrical latch pin cavity 86 formed in the base 34. The latch pin cavity 86 is located on a shoulder 34g of the top 34c of the base 34 and toward the front wall 34a centrally between side walls 34e and 34f, as illustrated in FIGS. 12 to 17. The latch pin 84 includes a cylindrical latch pin shaft 88 having upper and lower ends 88a and 88b wherein the lower end 88b is anchored in the latch pin cavity 86 by glue or any other suitable method to lock the latch pin to the base and prevent rotation and withdrawal. A cylindrical collar 90, having a smaller diameter than the center aperture 22b of the disc 22, is securely attached to the latch pin shaft 88 between the upper and lower ends 88a and 88b. The collar 90 includes a lower beveled surface 92 which is adapted to engage an opposing upper beveled surface 94 on the hub 64. This secures the hub 64 to the base 34 while enabling free rotation of the hub 64 around the latch pin shaft 88. Thus, the latch pin and the surface 34g bearingly receive the hub and spindle. The hub 64 has an annular shoulder 96 for supporting the central area 22b of the laser disc 22 and a spindle 96a for receiving and centering the disc on the hub when the center aperture 22b of the disc is placed over the spindle 96a which is sized to mate with the disc aperture.

The buffing wheel 26 is a circular wheel having inner and outer surfaces 100 and 102 and an outer rim 104. The outer rim 104 is made from a compressible soft cloth adapted to engage and fold or collapse against the disc to engage the entire readable playing area or surface 22d to buff off or remove the scratches or marks from the disc in this area. Preferably, the wheel is made of plastic with a replaceable cloth insert so that a worn cloth rim can be replaced. The wheel includes a retractable handle 106 which extends from a handle cavity 108 in the wheel's outer surface 102 and which is used as a crank to rotate the buffing wheel. Alternatively, the buffing wheel could be rotated by any suitable mechanical or motorized system. The buffing wheel also includes a stub shaft 110 extending from the center of the inner surface 100 of the wheel 26. The buffing wheel 26 is received by the main body 28 in a buffing wheel cavity 112 in the outer surface 114 of the side wall member 30, as best shown in FIGS. 4 and 11. The buffing wheel cavity 112 is substantially cylindrical, having a bottom slot 116 for allowing the buffer wheel to engage the disc as shown in FIG. 3. The buffing wheel cavity 112 also includes a central hole or bearing 118 for bearingly receiving the stub shaft 110, which enables placement of the buffing wheel 26 into the cavity 112. It should be appreciated that the buffing wheel is thereby maintained on an axis parallel to the main body and perpendicular to the disc 22 at an offset position closer to side wall 34e than side wall 34f of the base 34. It should further be appreciated that after the buffing wheel is used, it may be removed from the cavity for cleaning or for replacement.

Figure 9:
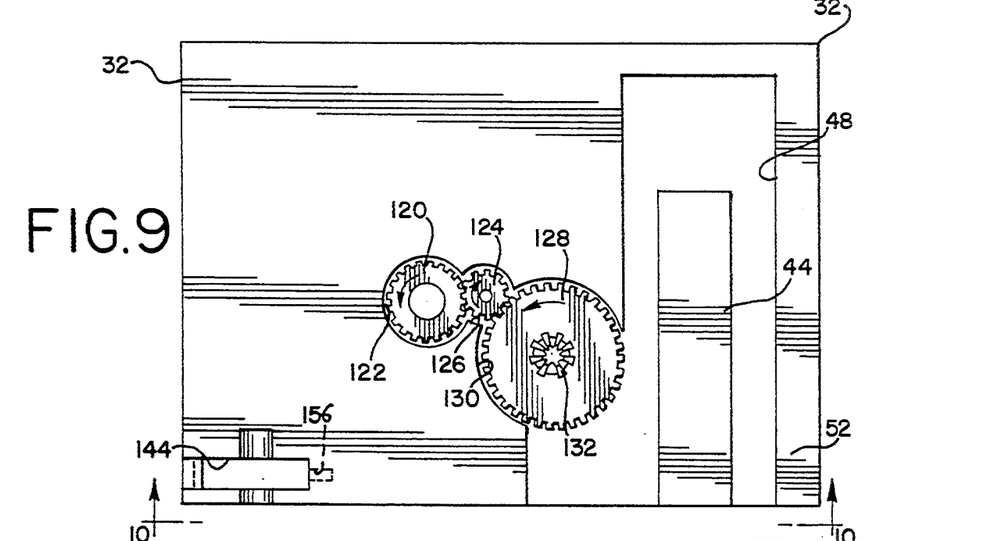
FIG. 9 is a side view of the inside surface of the other side wall member of the main body.
Figure 10:
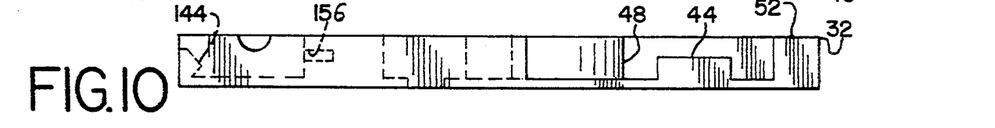
FIG. 10 is a bottom plan view of the side wall in FIG. 9 taken substantially along line 10—10 of FIG. 9.

When the side wall members 30 and 32 are secured together and the buffing wheel 26 is placed in the buffing wheel cavity 112, the stub shaft 110 extends through the bearing 118 and locks into a first pinion gear 120 which is rotatably mounted on the inner surface 52 of the side wall 32 in the first pinion gear cavity 122, as seen in FIG. 9. It may be appreciated that the wheel 26 and shaft 110 may be an assembly that is replaceable or exchangeable for a new buffing wheel or a cleaning wheel structured only to clean the surface of a disc. Thus, the driving connection between the shaft 110 and the gear 120 may be easily separable to allow exchange of wheels. For example, a spline coupling may be used. The first pinion gear 120 meshes with an intermediate idler gear 124 rotatably mounted on the inner surface 52 of the side wall 30 in the idler gear cavity 126. The idler gear 124 further meshes with a second pinion gear 128 which is rotatably mounted on the inner surface 52 of the side wall 32 in a second pinion gear cavity 130. While not shown for simplicity purposes, stub shafts or dowels may extend from the pinion gear 120, idler gear 124 and pinion gear 128 to be matingly received in bores formed in the cavities of the side wall member 32 for rotatably supporting these gears on the side wall member. A bevel or miter gear 132 is centrally attached to the second pinion gear 128. The bevel or miter gear 132 is adapted to mesh with the miter or bevel gear 74 attached to shaft 68 when the main body 28 is moved to the closed position. When the main body 28 is moved to the open position, the bevel gear 132 will separate from the bevel gear 74.

Accordingly, counter-clockwise rotation of the buffing wheel 26, as shown by the arrow in FIG. 1, causes the stub shaft 110 to rotate the first pinion gear 120 in the same direction as the buffing wheel. The first pinion gear 120 rotates the intermediate idler gear 124 clockwise which in turn rotates the second pinion gear 128 and the bevel gear 132 counter-clockwise. Bevel gear 132 rotates bevel gear 74, shaft 68 and disc driving wheel 60 clockwise, whereby driving wheel 60 causes the disc 22 to rotate counter-clockwise on the hub 48, as shown by the arrow in FIG. 1. It is preferable that the buffing wheel and the disc be rotated in the counter-clockwise direction. The disc rotates at a slightly slower speed than the buffing wheel, and at a speed so that the effects of the offset of the buffing wheel and the rotation of the disc cancel each other, thereby producing a buffing path on the disc that is substantially radial.

After a disc 22 is inserted in the buffing apparatus 20 on the spindle of the hub 64, the main body is lowered on the disc support arm 24 to the closed position. The main body is secured in the closed position by a latch 140 which coacts with the latch pin 84, as shown in FIGS. 12 to 17 to place the buffing wheel under compression on the disc. The latch 140 is slidably received in opposed latch cavities 142 and 144 on the inside surfaces 50 and 52 of side wall members 30 and 32. The latch 140 includes a stem 146, a head 148 attached to the stem, a V-shaped stop member 150 positioned between the stem 146 and the head 148, and a locking lip 152 attached to the bottom of the head 148.

In the open position, the stem 146 protrudes from the front of the main body 28 for engagement by the operator, as seen in FIG. 11. The latch 140 is biased toward the front of the main body 28 by a spring 154 positioned in a spring cavity 156 in the latch pin cavity 144 and engaging the head 148 of the latch 140. The latch 140 is normally positioned in the opposing latch cavities 142 and 144 by the engagement of the stop member 150 of the latch 140 on the stopping shoulder 158 in cavity 144, as seen in FIGS. 12 and 16. Accordingly, the spring and the stopping shoulder 158 coact to enable the stem 146 to normally protrude from the body 28 at a predetermined distance, as specifically shown in FIGS. 11, 12, and 16. As the main body is lowered on the upstanding arm toward the closed position after the disc is inserted, the edge of the locking lip 152 engages the rounded surface of the upper end 88a of the latch pin shaft 88. The latch 140 is driven inwardly against the spring 156 by the pin shaft, as shown in FIGS. 14 and 15. When the main body is substantially in the closed position, the latch 140 is biased by the spring into the latch engaging position wherein the locking lip 152 securely matingly engages a notch 160 on the latch pin shaft 88, as specifically shown in FIGS. 1, 16, and 17. This prevents the main body from sliding on the upstanding arm and disengaging from the closed position during buffing and maintains the buffing wheel in compression against the disc.

After the buffing process is completed, the stem 146 of the latch 140 is pushed or directed inwardly. This releases the locking lip 152 from the notch 160 on the latch pin 88 and allows the main body to slide upwardly on the upstanding arm toward the open position. The buffed disc may then be removed.

It should be appreciated that the side wall members 30 and 32 of the main body 28 may be suitably secured together in guidable and slidable engaging position on the upstanding arm by any well known method.

To remove scratches or marks from the disc, the disc 22 is inserted in the laser disc buffing apparatus 20 which is in the open position. The center aperture 22b of the disc is placed over the latch pin and onto the spindle of the hub such that the central area 22a rests on the annular shoulder of the hub, the outer edge of the disc engages and rests on the beveled surface of the driving wheel, and the area between the central area and the outer edge opposed to the buffing wheel rests on the conical support roller. The main body is then moved to the closed position such that the locking lip of the latch securely engages the notch of the latch pin, thereby preventing the main body from moving relative to the upstanding arm during buffing. In the closed position the soft cloth rim of the buffing wheel folds or collapses against the entire laser readable surface 22d of the disc under significant compression and at a position radially offset from the center of the disc. The handle extending from the buffing wheel is manually rotated in a counter-clockwise direction for the embodiment illustrated to rotate the buffing wheel. This simultaneously causes rotation of the driving wheel and of the disc in a counter-clockwise direction. After buffing is completed, the latching mechanism is released, the main body is moved to the open position, and the disc is removed.

With the exception of the latch spring, various parts of the apparatus are preferably molded of a suitable plastic, although they could be made of other materials if desired. The plastic parts, except for the drive wheel 60, would normally be made of a relatively hard and non-resilient plastic, while the drive wheel would be made of a resilient plastic or rubber. The polishing or buffing wheel would be made of plastic and include a suitable fabric or cloth insert at the periphery attached to the plastic wheel. Preferably, the cloth portion would be removable so that it could be replaced when worn out. When made of cloth, strips of cloth could be provided extending from the hub of the wheel that may be suitable impregnated with an abrasive or cleaning substance. It is also contemplated that the buffing or cleaning element of the wheel may be made of natural or synthetic foam rubber, cotton, or any other suitable synthetic material. While the wheel is shown to buff or clean substantially the entire disc playing area, it will be appreciated that it could be arranged to buff or clean any selected part of the area.

Maintaining the axis of rotation of the buffing wheel perpendicular to the axis of rotation of the disc allows the application of sufficient pressure to the surface of the disc to accomplish buffing for removing scratches. The contact pressure between the disc and the buffing wheel is provided by a compression force between the disc and the axis of the buffing wheel. This force can be higher and sufficient to cause buffing because materials are better able to resist higher forces in compression than in bending. Accordingly, it is preferable that the buffing wheel be located directly above the surface that is to be buffed. This is unlike the prior art because the axis of rotation in the prior art cleaning wheels or surfaces is approximately parallel with the disc's axis of rotation causing those devices to be incapable of providing sufficient pressures between the disc and the cleaning surface.

The buffing wheel buffs the disc at an offset or angled position from center or from a radius of the disc to smooth out the entire surface of the disc to remove the scratches. This means that the buffing wheel does not contact the disc in a purely radial manner which is an advantage of the present invention because the circumferential component of the buffing wheel is used to offset or compensate for the circumferential component that is due to the rotation of the disc, so that the resulting buffing action is substantially along a radius of the disc. If the buffing wheel was positioned in a purely radial fashion, it would trace an undesirable path on the disc with a component in the circumferential direction due to the relative motion of the disc. In the illustrated embodiment, the vertical plane of the wheel 26, as seen most clearly in FIG. 6, is offset radially when contacting a disc to be buffed as above described, and in a direction toward the driving direction of the disc. Thus, when the disc is driven counter-clockwise, as shown, the plane of the wheel is angled to the left side of the disc center, and the wheel is driven counter-clockwise, as seen in FIG. 1. If the wheel and disc are driven clockwise, the wheel is angled to the right side of the disc center when viewed as in FIG. 6.

Figure 18:
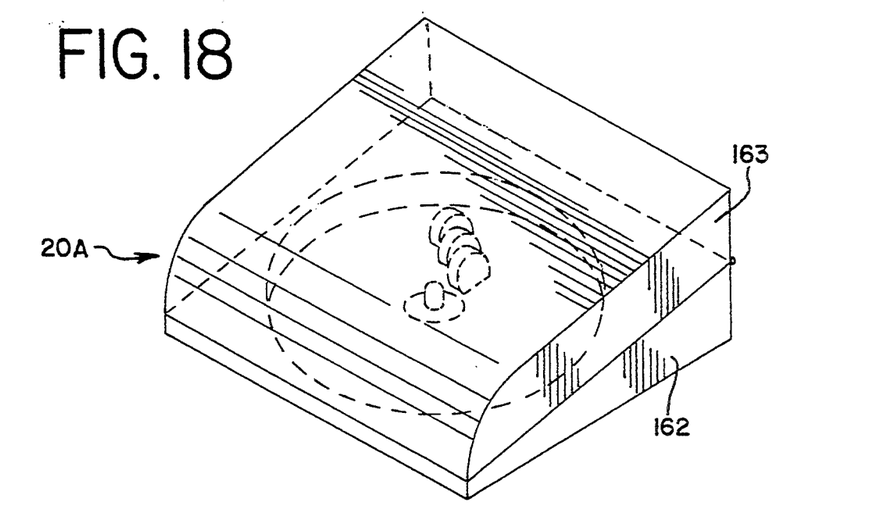
FIG. 18 is a perspective view of a modified horizontally configured buffing apparatus according to the invention having a plurality of buffing wheels and with some internal parts shown diagrammatically and in phantom.
Figures 19, 20:
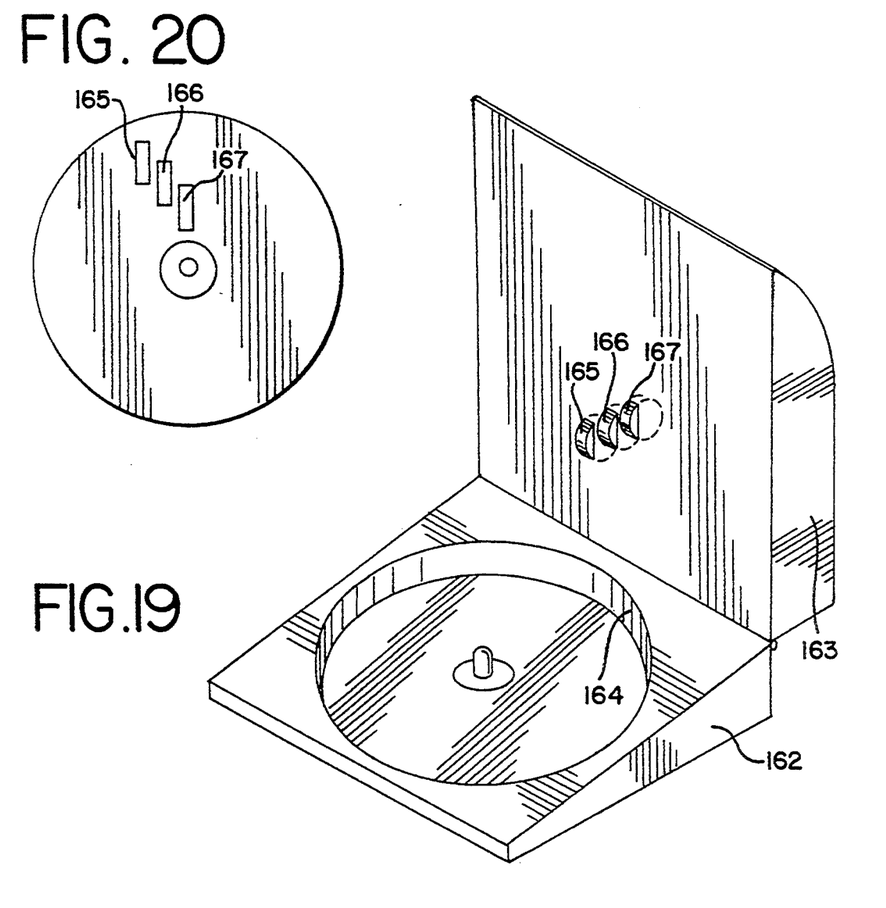
FIG. 19 is a perspective view of the buffing apparatus of FIG. 18 with the cover open.
FIG. 20 is a diagrammatic top plan view of the buffing wheels in position on a disc.

It should also be appreciated that plural polishing wheels may be used instead of a single wheel, as illustrated in FIGS. 18 to 20.

It should also be appreciated that the embodiment of FIGS. 1 to 17 of the present invention does not use a full platen support as in the prior art. Use of a full platen support would prevent the disc buffing apparatus from being compact due to the necessity of perpendicularly disposing the buffing wheel to the disc. In the case of the buffing apparatus for a compact laser disc, the apparatus with a full platen would be unable to fit within the area of a double compact laser disc case.

Another embodiment of the invention is diagrammatically shown in FIGS. 18 to 20 and generally indicated as 20A. This embodiment differs from the embodiment of FIGS. 1 to 17 in that it shows how the buffing apparatus of the invention could include a plurality of buffing wheels instead of a single buffing wheel. This version would not be storable in a double compact laser disc case and would have a larger footprint.

The apparatus 20A includes generally a basle 162 and a cover 163. The cover would be hinged to the base so that it will open in a fashion as shown in FIG. 19. The base 162 includes a cavity 164 within which the last disc would be inserted and supported during buffing. In this embodiment, three buffing wheels 165, 166 and 167 are suitably mounted in the cover 163 which in closed position would position the wheels to cover the playing or readable area, as particularly shown in FIG. 20. Suitable drive elements would cause rotation of the buffing wheels and the disc during the buffing operation. Preferably, this embodiment would have a motorized drive system. Because of the plurality of buffing wheels that would be smaller in diameter and in staggered alignment to provide full coverage over the entire readable or playable area of the disc, the height of the overall unit would be substantially at a minimum to produce a low-profile component. Thus, a plurality of overlapping buffing wheels would be provided in place of a single buffing wheel that would have to be much larger and taller in size in order to cover the entire playing area. It should be further understood that the disc would be supported and driven in substantially the same way as above described in the first embodiment.

It will be understood that modifications and variations may be effected without departing from the scope of the novel concepts of the present invention, but it is understood that this application is to be limited only by the scope of the appended claims.

The invention is hereby claimed as follows:

1. Apparatus for buffing a circular laser disc having a central area, a circular outer edge, and a surface therebetween, said apparatus comprising:
    means for supporting said laser disc;
    means for rotating said laser disc in a first plane about a first axis;
    means for buffing said laser disc including a buffing wheel having an outer rim and adapted to rotate in a second plane about a second axis, said second plane being substantially perpendicular to said first plane;
    means for rotating said buffing wheel;
    means for selectively positioning said buffing wheel in engagement with said laser disc under sufficient compression to compress said outer rim of said wheel on said surface of said laser disc for radially buffing said disc and for positioning said buffing wheel out of engagement with said laser disc so that said disc may be placed on or removed from said supporting means;
    whereby rotation of said disc and said buffing wheel on said laser disc removes scratches or marks from said surface of said laser disc.

2. The apparatus of claim 1, wherein said disc supporting means includes a hub means for supporting said central area of said disc, a wheel means for supporting said outer edge of said disc, and a roller means for supporting said disc between its central area and its outer edge.

3. The apparatus of claim 2, wherein the disc rotating means further includes means for rotatably driving said wheel means.

4. The apparatus of claim 1, wherein the disc rotating means includes a rotatably driven wheel means which engages said outer edge of said laser disc to rotate said laser disc.

5. The apparatus of claim 1, wherein said means for rotating said buffing wheel is drivingly connected to said disc rotating means such that rotation of said buffing wheel causes rotation of said laser disc.

6. The apparatus of claim 1, wherein said buffing wheel has a flexible outer rim adapted to engage said surface of said laser disc under compression.

7. The apparatus of claim 6 wherein said means for rotating said buffing wheel includes a handle means attached to and adapted to selectively extend from and retract into said buffing wheel for manually rotating said buffing wheel.

8. The apparatus of claim 6, wherein said means for positioning said buffing wheel includes a body means for supporting said buffing means, said body means movable relative to said disc supporting means between buffing wheel disc engaging position in which said buffing wheel engages the surface of the laser disc and a disc non-engaging position in which said buffing wheel does not engage the surface of the laser disc.

9. The apparatus of claim 8, wherein said means for positioning said buffing wheel further includes a locking means for releasably locking said body means in buffing wheel disc engaging position.

10. The apparatus of claim 6, wherein said buffing wheel engages said disc at an offset position from a radius of said disc.

11. Apparatus for buffing a circular laser disc having a central area, an outer edge, and a surface therebetween, said apparatus comprising:
- a disc support arm which supports said disc for rotation in a first plane about a first axis, said disc support arm including means for supporting said central area of said disc, means for supporting said outer edge of said disc and driving said disc, and means for supporting said disc between said central area and said outer edge;
- a buffing wheel;
- means for rotating said buffing wheel in a second plane about a second axis; and
- a main body slidably connected to said disc support arm and having means for maintaining said buffing wheel in said second plane which is substantially perpendicular to said first plane, said disc support arm and said main body having means for reciprocally sliding said main body on said disc support arm between an open position in which said buffing wheel does not engage said disc and a closed position in which said buffing wheel engages said disc, said main body including means for drivingly connecting said buffing wheel rotating means to said means for supporting said outer edge of said disc such that rotation of said buffing wheel causes rotation of said disc when in said closed position, said disc support arm and said main body having means for releasably maintaining said main body in said closed position;
- whereby after said laser disc is inserted on said disc support arm and said main body is moved to said closed position, said buffing wheel engages said disc under compression, and rotation of said buffing wheel causes rotation of said disc such that the buffing wheel buffs the disc to remove scratches or marks from said surface of said laser disc.

12. The apparatus of claim 11, wherein said disc support arm includes a base and an upstanding arm attached to and extending substantially perpendicular from said base.

13. The apparatus of claim 12, wherein said means for supporting said central area of said disc includes a freely rotatable cylindrical hub mounted on said base.

14. The apparatus of claim 12, wherein said means for supporting said outer edge of said disc includes a wheel having a beveled surface which engages said outer edge of said disc.

15. The apparatus of claim 12, wherein said means for supporting said disc between said center and said outer edge includes a freely rotatable conical roller mounted on said base.

16. The apparatus of claim 12, wherein the reciprocal sliding means includes side walls on the main body that are slidably assembled together on said upstanding arm.

17. The apparatus of claim 16, wherein the reciprocal sliding means further includes side walls on said upstanding arm adapted to slidably coact with said side walls on said main body.

18. The apparatus of claim 17, wherein said reciprocal sliding means includes rib and groove means on said upstanding arm of said disc support arm and said side walls of said main body.

19. The apparatus of claim 11, wherein said means for rotating said buffing wheel includes a retractable handle means connected to said buffing wheel for rotating said buffing wheel.

20. The apparatus of claim 11, wherein said means for maintaining said buffing wheel about said second axis includes a cavity and a bearing in said main body adapted to receive said buffing wheel and a shaft extending from said, wheel.

21. The apparatus of claim 11, wherein said means for connecting said buffing wheel to said means for supporting said outer edge of said disc includes a stub shaft connected to said buffing wheel, a first pinion gear connected to said stub shaft, an intermediate idler gear engaging said first pinion gear, a second pinion gear engaging said idler gear, a first bevel gear engaging said second pinion gear, a second bevel gear engaging said first bevel gear, and a shaft attached to said second bevel gear at one end and said driving wheel at said other end.

22. The apparatus of claim 11, wherein said means for releasably maintaining said main body in said closed position includes a latch connected to said main body adapted to engage a latch pin connected to said disc supporting arm.

23. Apparatus for buffing a circular laser disc to remove surface scratches and marks from the playing or readable surface of the disc, wherein the laser disc includes a central opening, a circular peripheral outer edge, and the playing or readable surface between the central opening and the outer edge, said apparatus comprising:
- means for rotatably supporting the laser disc to rotate in a first plane including a spindle over which the disc is received,
- means for driving said disc,
- buffing wheel means rotatable in a second plane and having flexible outer rim means for buffing said disc,
- means for rotatably supporting the buffing wheel means in said second plane which is substantially perpendicular to said first plane, said supporting means being selectively movable relative to the disc supporting means to position the flexible outer rim means of the buffing wheel means into engagement with the disc under sufficient compression for buffing the disc or into non-engagement with the disc for placing a disc on or removing the disc from the spindle,
- and means drivingly connecting the buffing wheel means to the disc driving means, whereby rotation of the buffing wheel means causes rotation of said disc.

24. The apparatus of claim 23, wherein said buffing wheel means includes a single buffing wheel.

25. The apparatus of claim 23, wherein said buffing wheel means includes a plurality of buffing wheels.

26. The apparatus of claim 23, wherein said buffing wheel means includes at least two buffing wheels arranged in overlapping relation.

* * * * *